(No Model.)
J. S. COCHENNOUR.
MINNOW TRAP.
No. 427,049. Patented May 6, 1890.
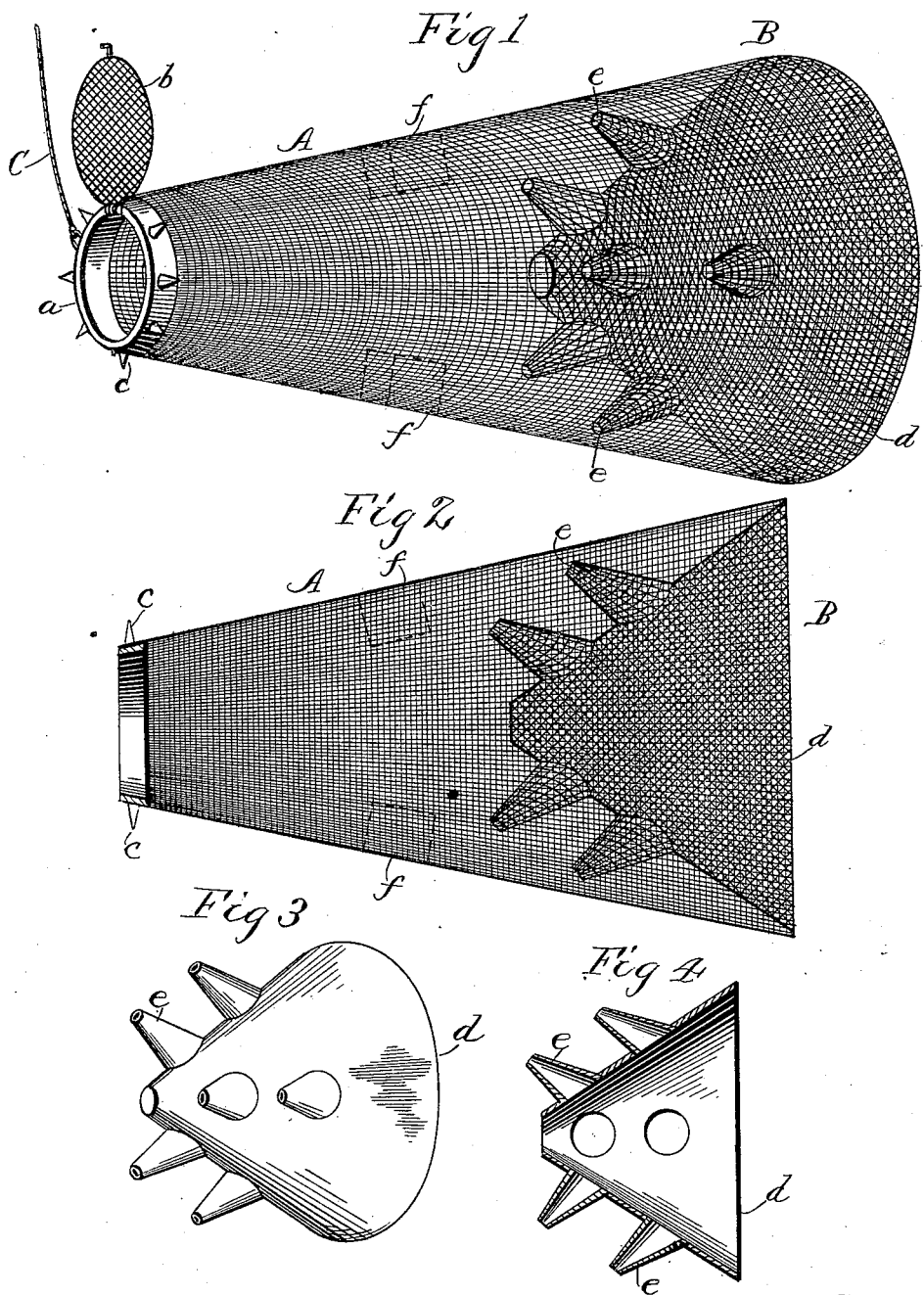

UNITED STATES PATENT OFFICE.

JOHN S. COCHENNOUR, OF OLNEY, ILLINOIS.

MINNOW-TRAP.

SPECIFICATION forming part of Letters Patent No. 427,049, dated May 6, 1890.

Application filed February 10, 1890. Serial No. 339,829. (No model.)

*To all whom it may concern:*

Be it known that I, JOHN S. COCHENNOUR, a citizen of the United States, residing at Olney, in the county of Richland and State of Illinois, have invented certain new and useful Improvements in Minnow-Traps; and I do hereby declare the following to be a full, clear, and exact description of the invention, such as will enable others skilled in the art to which it appertains to make and use the same, reference being had to the accompanying drawings, which form part of this specification.

My invention relates especially to a trap for catching minnows, and has for its object to provide a device that can be thrown into a lake or stream from the shore, and which will be at once securely anchored at one end, while the other end will float with the tide before it sinks, thus bringing the mouth of the trap downstream when it settles upon the bed of the stream or lake; and it consists in the construction hereinafter described, and particularly pointed out in the claims.

It has been satisfactorily demonstrated that minnows are more readily caught in a trap when the mouth of the trap stands or opens downstream, so that they are compelled to swim against the current in order to enter the trap; and one object of my invention, therefore, is to so construct the trap that it will naturally assume this position when placed in running water.

Referring to the accompanying drawings, Figure 1 is a perspective view, and Fig. 2 a longitudinal section, of a trap constructed according to my plan. Fig. 3 is a perspective view, and Fig. 4 a sectional view, of a modified form of the bottom separate from the body of the trap.

Like letters of reference refer to corresponding parts in each figure of the drawings.

In carrying out my invention I construct the trap of any suitable material, such as woven wire, sheet metal, wood, gutta-percha, glass, or any material adapted to the purpose.

The form of my trap is that of a truncated cone, the smallest end of which is re-enforced by a heavy metal ring or band $a$, to which is hinged a door $b$. The ring $a$ is provided with a number of sharp radial spikes or teeth $c$, some of which in any position will anchor in the bed of the stream and prevent the trap from being carried down by the current.

The large end B of the trap has an inwardly-projecting cone-shaped bottom $d$, which is also truncated to form an opening at the apex, and has in its walls a number of openings, from which smaller truncated cones $e$ extend inward, which openings and cones form passages through which the fishes may enter the trap.

The broken lines at $f$ designate the usual bait-pockets with which traps of this character are provided.

For the reason above set forth that the mouth of the trap should open downstream the shape of my trap is an important feature, since it causes it to be turned into the proper position by the force of the current. The small end being weighted and provided with the spikes $c$, will remain in position, while the large end will be carried around to the proper position.

C designates a cord or line, which is attached to the trap at the small end and serves as a means for controlling in throwing it into or in hauling it out of the water.

In Figs. 1 and 2 the trap and conical bottom $d$ are shown as made of woven wire, while in Figs. 3 and 4 the bottom is represented as being made of some solid material, as wood, gutta-percha, glass, or sheet metal.

As above stated, the trap may be made of any suitable material, and the different parts may be made of different materials, as may be preferred. When the bottom is to be made of wood, it is conveniently formed by turning and then boring the openings to form the passages. The small cones $e$ in such case are made separate, and may be set into the openings, or, if made of suitable material, may be attached to the surface. If desired, the body of the trap may be turned out of wood and its inner portion bored out and the conical head inserted.

Having thus fully described my invention, what I claim as new, and desire to secure by Letters Patent of the United States, is—

1. A fish-trap having its body in the form of a truncated cone and having in its large end a conical bottom projecting inward, with inwardly-opening passages for fishes, and having its small end only weighted for anchoring the trap, as and for the purpose set forth.

2. A fish-trap having an inwardly-projecting hollow conical bottom with a number of inwardly-opening passages therein on its sides for the passage of fishes, the small end being weighted and provided with outwardly-projecting holding-teeth, substantially as set forth.

3. A fish-trap having its body in the form of a frustum of a cone, with an inwardly-projecting bottom having openings in its sides and having inwardly-projecting hollow truncated cones around or in said openings, the small end of the body being weighted and provided with outwardly-projecting holding-teeth and a door, substantially as set forth.

In testimony whereof I affix my signature in presence of two witnesses.

JOHN S. COCHENNOUR.

Witnesses:
WICKLEFFE HIGGINS,
GEORGE W. STOCKWELL.